Patented Dec. 22, 1953

2,663,496

UNITED STATES PATENT OFFICE 2,663,496

FUZE TIME COMPUTER

Norman P. Heydenburg, Silver Spring, Md., and Richard B. Roberts, Washington, D. C.

Application January 24, 1947, Serial No. 724,200

2 Claims. (Cl. 235—61.5)

The present invention relates to fuze-setting for projectiles and more particularly to means for and a method of computing the time-setting of fuzes by combined electrical and mechanical means.

A principal object of the invention is an apparatus that can quickly and accurately solve for the required time as a result of mechanical and electrical impulses that are proportional to the individual factors affecting the problem.

Assuming that a target is flying horizontally with constant speed, the problem requires the apparatus to solve the following empirically verified equation:

$$R_f = \sqrt{[R_p + r_p(t_f + t_0)]^2 + \left[\sqrt{E^2 + T^2 \frac{R_p}{t_p}}(t_f + t_0)\right]^2}$$

where:

$R_f$ = the approximate slant range to the future target position
$E$ = elevation lead angle, measured in radians
$T$ = train lead angle, measured in radians
$R_p$ = present slant range
$r_p$ = range rate
$t_p$ = time of flight of projectile to present position, that is, the time that has elapsed between the instant of firing the projectile and the present instant
$t_f$ = time of flight of projectile to future position
$t_0$ = dead time (time between setting of fuze and firing of shell)

With values of $R_f$ available, the corresponding future time of flight or the fuze time, $t_f$, can be obtained from ballistic tables. In the system developed in accordance with the principles of the invention, $t_f$ is obtained from a computed voltage proportional to $R_f$ by the use of a suitable cam having characteristics determined by the relation between $R_f$ and $t_f$.

The apparatus solves the equation by performing vector additions at right angles, by the expedient of deriving two alternating voltages, of line frequency, that are proportional to the components to be added, phasing one of them at 90° to the other, and placing them in series.

If further vector additions are needed, the resultant, obtained as above, is rectified and employed to provide a new alternating voltage, which may in its turn be combined with another voltage at right angles to provide a further voltage, and so on.

Mechanical means such as gears and cams may be employed to change the nature of a function and to combine it with the electrically-produced results.

The invention will be described in the form of an embodiment designed for use with 5″–38 shells, although it should be understood that its use is not limited to any definite size of shell.

Figure 1:
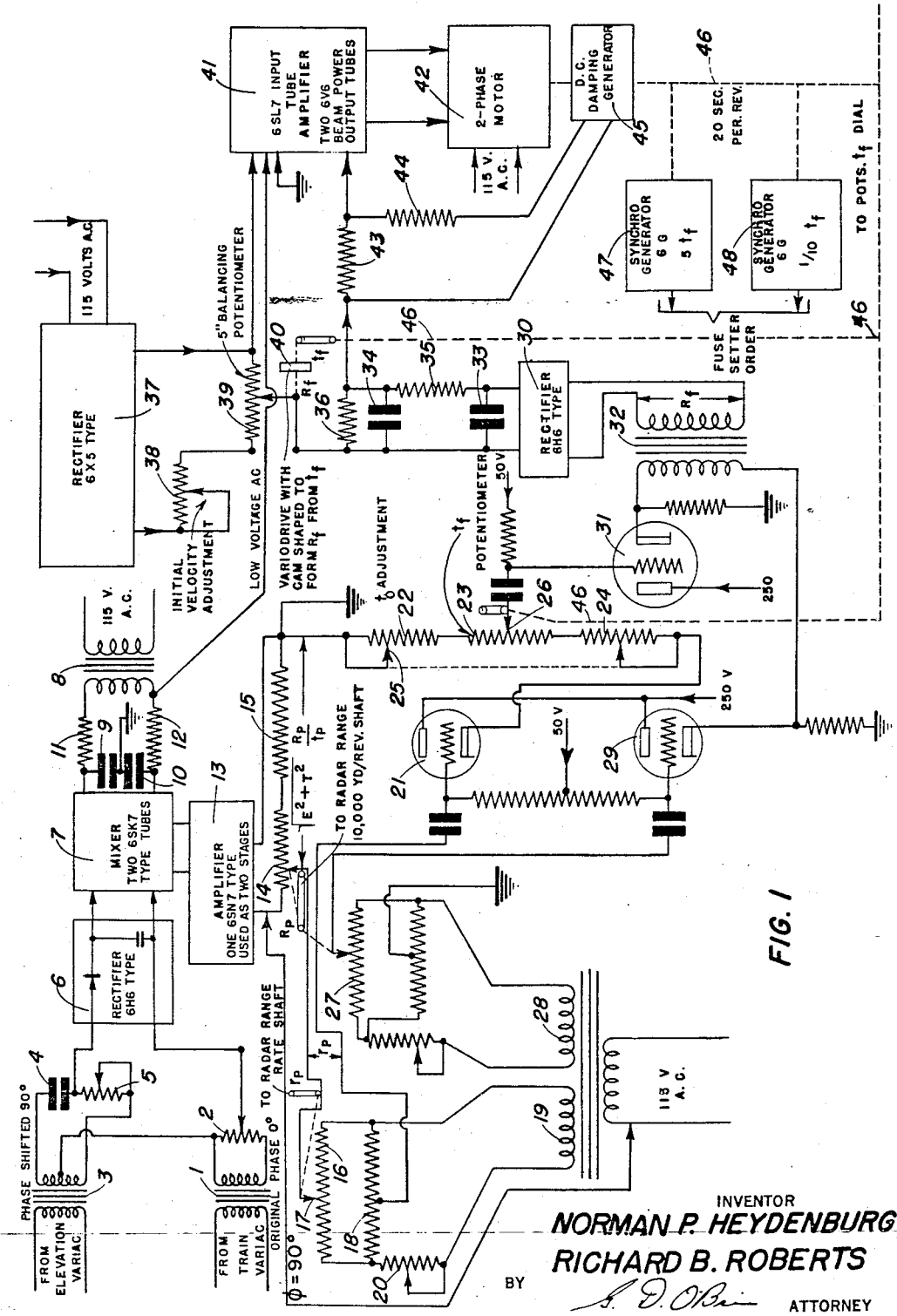
Figure 2:
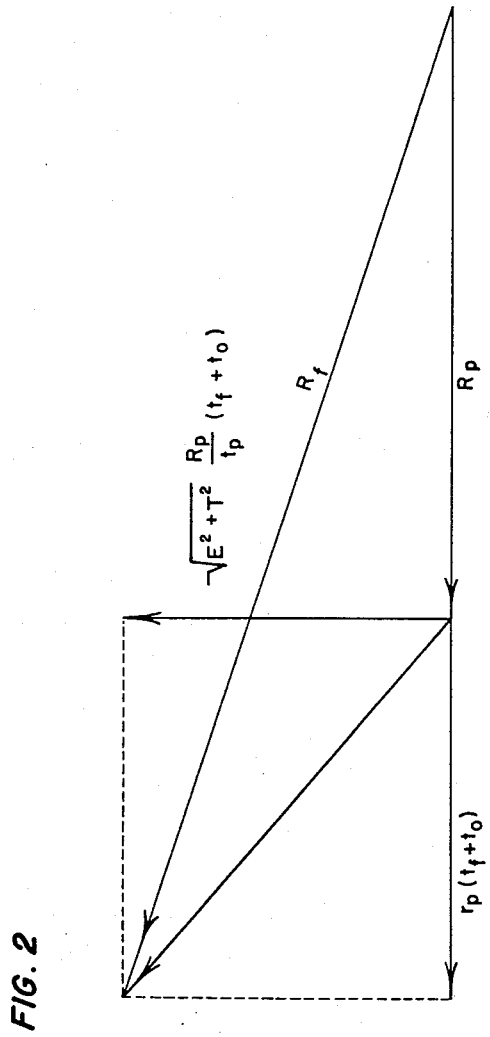

In the accompanying drawings, forming part of this specification:

Fig. 1 is a diagram showing the circuit connections and mechanical devices included in the apparatus, and Fig. 2 is a vector diagram showing the relations existing between the component representing the present range of the target, the increase in range during the dead time and the future time in line with the present range, and the other component at right angles to said first component, representing the change in range during the dead time and the future time, due to the elevation and train lead angles corresponding to the relative motion of the target.

In effectuating the computation, the first step is to add the elevation and train vectorially at right angles. The purpose of this is to evaluate the expression $$\sqrt{E^2 + T^2}$$

which appears as one of the functions under the main radical in the equation for $R_f$. The electrical evaluation consists in applying a voltage proportional to the train angle, derived from the train Variac of the computer to the input winding of a transformer 1, which has a 1,000 ohm loading potentiometer 2 across its secondary winding and applying a voltage proportional to the elevation angle, derived from the elevation Variac of the same computer to the input winding of a transformer 3, which has a center tapped secondary. A capacitor 4 of the order of 1 mfd. and a loading potentiometer 5, which may be adjusted so that its resistance is equal to the capacitive reactance of the capacitor 4 are connected in series across the secondary of the transformer 3 to obtain a voltage phased 90° to the voltage across the potentiometer 2. A locking potentiometer is one whose sliding contact may be secured permanently in position after it is once adjusted to the proper setting. In the present case, potentiometer 2 must be adjusted so that those portions of the train and elevation voltages introduced into the circuit are both to the same proper scale to be consistent with one another. Potentiometer 5 is adjustable for an entirely different reason, namely, to adjust the phasing of the elevation voltage to exactly 90° to the train voltage, which is accomplished by capacitor 4 and resistor 5 jointly.

The outputs of the two circuits are then fed in series to a rectifier 6. This rectifier preferably is of the diode type, although other linear rectifiers than vacuum tubes might also be used if desired. The obvious result of the rectification is to remove the phasing of the alternating current resultant, which would otherwise be oriented in an unknown direction, neither parallel nor perpendicular to the line voltage, and therefore not suited for further manipulation to the end of solving the problem.

The unidirectional output of the rectifier 6 may be used to provide an alternating voltage of known phase, by suitable means, such as a mixer 7. This mixer 7 may comprise a pair of thermionic tubes, preferably, supplied with alternating voltages on their grids, and connected in push pull so that when the grid voltages have a 180° phase difference and are equal, the plate output will be zero.

The two opposed alternating grid voltages are supplied from the opposite ends of the secondary winding of a transformer 8, and are phased at 180° to each other. The alternating voltage applied to each grid is also phased at 90° with the supply voltage by means of two capacitors 9 and 10, and two resistors 11 and 12, both respectively. The output of the rectifier 6 is applied to the grids as a bias, so as to decrease the potential of one grid while simultaneously increasing that of the other to a similar extent. This unbalances the output of the two tubes, resulting in the production of an alternating current approximately 90° out of phase with the line voltage, and of an amplitude corresponding to the rectifier output voltage.

The output of the mixer 7 is fed to an amplifier 13, which may comprise two stages, preferably using a single twin triode for simplicity. The output of the amplifier 13 is at 90° to the line voltage, but still proportional to $$\sqrt{E^2+T^2}$$

A radar range potentiometer 14 of 5,000 ohms is placed across the output of the amplifier 13, with a resistor 15 in series therewith, as shown, this resistor also being 5,000 ohms, and serving as an extender at the grounded side of the potentiometer 14. The resistor 15 thus virtually becomes a part of the potentiometer resistor 14, that is, an extension thereof, so that the voltage value of a given shift of the slider is decreased, thus making the potentiometer more sensitive. The provision of such extender is possible here, provided the necessary shifts can all occur within the range of resistor 14; the net result is that shifts that would otherwise all be crowded within an end portion of resistor 14 may now be spread to take in much more of its extent, thus increasing the accuracy and sensitivity. The effect of the elements thus introduced is to cause the output of amplifier 13 to be multiplied by $R_p/t_p$. As this apparatus is designed in each instance for a specific type of projectile, simplifications are possible. For instance, from tables of ballistics of standard types of shells, it is found that the trajectories of a 5″–38 shell, fired at an average elevation of 10° are nearly enough straight, and traversed at nearly uniform velocities, to justify the approximation that a linear relation exists between $R_p/t_p$ and $R_p$. This gives $$\sqrt{E^2+T^2}(R_p/t_p)$$

which is, of course, still 90° out of phase with the line voltage.

This voltage is next placed in series with the output of a radar range rate potentiometer 16, by means of a slider 17, which is operated by the radar range rate shaft. A suitable neutral or reference point is obtained by a center-tapped resistor 18. Power is supplied from a transformer secondary winding 19 and adjustment is provided by a variable resistor 20. The purpose of this resistor is to adjust the voltage drop in resistors 16 and 18. The zero position of slider 17 will be at the center of resistor 16, since resistor 18 is center-tapped. Since the slider 17 is shifted by a mechanical connection to the radar range shaft $r_p$, the voltage output between the center tap of resistor 18 and slider 17 represents $r_p$. The result is again an addition at 90°, giving a voltage equal to $$\sqrt{(E^2+T^2)\left(\frac{R_p}{t_p}\right)^2+r_p^2}$$

In order to avoid drawing any appreciable current from the potentiometers, which would disturb their accuracy, this output is fed to the succeeding circuit elements through a cathode follower. This comprises a tube 21, the cathode of which is connected to one end of a series string of three potentiometers, 22, 23, and 24. A hand adjusted potentiometer 22 introduces the fixed dead time adjustment to by means of a slider 25; the potentiometer 23, whose slider 26 is shifted by the shaft 46, hereinafter described, by a mechanical connection, introduces $t_f$; the potentiometer 24 merely has its slider 25 moved in step with that of the potentiometer 22, so that as the resistance changes in the potentiometer 22, they occur to an equal extent in the opposite sense in the potentiometer 24, thus keeping the total resistance in the circuit constant. The resistance between the sliders 25 and 26 is thus proportional to $t_0+t_f$ and the voltage drop is proportional to $$\sqrt{(E^2+T^2)\left(\frac{R_p}{t_p}\right)^2 r^2_p(t_0+t_f)}$$

This represents a voltage neither in phase with the line voltage, nor at right angles thereto, as indicated by the diagonal of the rectangle in Fig. 2 and which must be further combined vectorially with $R_p$ to provide the desired $R_t$.

This is accomplished by adding a voltage proportional to $R_p$, obtained from a potentiometer 27, which is operated by the range shaft of the radar. Since this voltage is derived from a secondary winding 28, it is in phase with the line voltage and thus in proper phase for simple vector addition. It is applied through another cathode follower, including a tube 29, to avoid drawing current from the potentiometer 27.

After this addition, it is again necessary to rectify the resultant, this time in order to make it possible to balance it against a D. C. voltage. A rectifier 30 is used for this purpose, a transformer 32 serving to feed the voltage proportional to $R_t$ to the rectifier 30. The transformer 32 has its primary winding fed on the one hand from the potentiometer 23, through another cathode follower including a tube 31, and on the other hand from the potentiometer 27, through the cathode follower including the tube 29.

The output of the rectifier 30 passes through a smoothing filter comprising a resistor 35 and two condensers 33 and 34, and shunted by a high resistance 36 of the order of 100,000 ohms, across which appears the smoothed rectified voltage representing $R_t$.

In order to obtain an adequate mechanical output corresponding to this voltage drop, it is balanced against the drop produced in a potentiometer 39. This is supplied with current from a rectifier 37, and its voltage drop is adjusted by a variable resistance 38 to accord with requirements. These requirements are that the response of the apparatus be properly correlated with the initial velocity of the projectile that is to be used, information that is readily available from ballistic tables. A variodrive with a cam 40 actuates the slider on the potentiometer 39 in such way that an input corresponding to $t_f$ provides a shift corresponding to $R_f$. Such variodrives are devices of the type disclosed in the U. S. Patent of Wm. J. Grace, No. 2,498,036, for "Transmission," issued February 21, 1950, and essentially include a cam or the like interposed in a mechanical transmission, said cam being properly shaped to modify the input motion so that the output motion is a different function, for example, so that rotation of the input shaft 46 representing $t_f$ yields rotation of the output shaft corresponding to $R_f$.

An amplifier 41 receives as its input the voltages across the resistance 36 and the active part of the potentiometer 39, in opposition to each other, and its output serves as one of the phases that supply a 2-phase motor 42. The amplifier 41 also has an alternating voltage applied to its grids; hence the output is alternating, modulated in accordance with the difference between the two D. C. voltages applied to the input.

The function of amplifier 41 is to provide sufficient A. C. power to energize one phase of the two-phase motor 42. This amplifier receives as its input the voltage taken off that portion of resistor 39 to the right of its slider, whose magnitude represents $R_f$, in series with the voltage across resistor 36, and further in series-opposition to the voltage across resistor 43. This composite D. C. input produces a grid bias for the amplifier whereby its A. C. output is controlled proportionately, to provide the "variable" and reversible phase, at 90° to the current from the mains, for motor 42.

Consequently, the motor 42 will run in one direction or the other depending on the relative phases of the inputs to the motor, the output of the amplifier 41 being either 90° ahead or behind the line voltage in phase. The drop across a resistor 43 provides a component that is used for damping. It may be relatively low, say 200 ohms, and a further resistance 44 of the order of 1,000 ohms may be placed in series in the circuit energizing a D. C. damping generator 45, which is mechanically connected to the motor 42 as indicated by a dotted line 46. The generator 45 is so connected in the circuit that its voltage always opposes the voltage derived from potentiometer 39, and thus tends to reduce the input voltage of amplifier 41 to zero more quickly than would be the case without said generator. Thus overshooting and hunting, due to inertia of motor 42, are prevented by the damping generator. Geared to the mechanical drive 46 are two synchrogenerators 47 and 48 which yield the fuze setter orders.

It will be seen, therefore, that this apparatus provides an efficient and relatively instantaneous method of obtaining the required time orders in response to the various factors that are fed thereto.

We claim:
1. A fuze time computer comprising means providing a first alternating voltage proportional to the train angle of a target, means providing a second alternating voltage proportional to the elevation angle of said target, said voltages having the same phase, means for shifting the phase of one of said voltages to quadrature relationship with respect to the phase of the other of said voltages, means for combining said voltages vectorially, means for providing a unidirectional voltage proportional to the resultant of said alternating voltages, a source of alternating current, means connected to said source and controlled by said unidirectional voltage to provide a current in phase quadrature with said source and proportional to said unidirectional voltage, a first adjustable resistor to which said current is supplied thereby providing a third alternating voltage in phase quadrature with the voltage of said source, the adjustment of said resistor being determined by the present range of said target, means connected to said source for providing a fourth alternating voltage, said voltage being proportional to the range rate of a target, means for combining said third and fourth voltages vectorially, a second adjustable resistor having its magnitude determined by the time delay between the setting of the fuze and the firing of the shell, a third adjustable resistor connected in series with said second resistor and having its magnitude determined by the time of flight of a projectile to the future target position, means for applying the resultant of said third and fourth alternating voltages across said second and third resistors, means for vectorially combining a voltage proportional to said last-named resultant and a voltage proportional to the present range of a target, thereby providing a voltage proportional to the future range of a target, means for rectifying the resultant of said last-named voltage, and means controlled by said rectified resultant for providing a signal representing the time of flight of a projectile to a future target position.

2. In a fuze time computer, a first transformer having a secondary with a center tap connection, the primary of said first transformer being supplied with an alternating voltage representing the angle of elevation of a target, a second transformer, said second transformer having a voltage representing the train angle of a target applied to its primary, a variable resistor having an adjustable terminal, said resistor being connected across the secondary of said second transformer, a phase shifting network including a resistor and capacitor connected in series across the secondary of said first transformer for shifting the phase of the voltage representing the elevation angle to quadrature relationship with respect to the voltage representing the train angle, said last-named resistor being adjustable whereby its resistance is adapted to be made equal to the reactance of said capacitor, means interconnecting the center tap connection of said first transformer and a terminal of said second transformer, a rectifier, means connecting the adjustable terminal of said variable resistor to said rectifier, means interconnecting the common point between said capacitor and resistor to said rectifier, and means connected to said rectifier for providing an alternating current proportional to the output of said rectifier.

NORMAN P. HEYDENBURG.
RICHARD B. ROBERTS.

References Cited in the file of this patent
UNITED STATES PATENTS

| Number | Name | Date |
| --- | --- | --- |
| 2,077,401 | Crosby | Apr. 20, 1937 |
| 2,361,169 | Bivens | Oct. 24, 1944 |
| 2,408,081 | Lovell et al. | Sept. 24, 1946 |
| 2,420,193 | Rich | May 6, 1947 |
| 2,481,492 | Bjarnason | Sept. 13, 1949 |
| 2,483,090 | Fuller | Sept. 27, 1949 |